(12) United States Patent
Kimball et al.

(10) Patent No.: US 7,313,312 B2
(45) Date of Patent: Dec. 25, 2007

(54) OPTICAL FIBER AND METHOD FOR MAKING SUCH FIBER

(75) Inventors: Ronald L. Kimball, Corning, NY (US); Robert A Knowlton, Wellsboro, PA (US); Joseph E McCarthy, Addison, NY (US); Ji Wang, Painted Post, NY (US); Donnell T. Walton, Painted Post, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 11/056,870

(22) Filed: Feb. 11, 2005

(65) Prior Publication Data

US 2005/0271347 A1    Dec. 8, 2005

(51) Int. Cl.
  *G02B 6/00*    (2006.01)
(52) U.S. Cl. .................. 385/142; 385/123; 385/127; 385/141
(58) Field of Classification Search ............... 385/123, 385/127, 141, 142
  See application file for complete search history.

(56) References Cited

U.S. PATENT DOCUMENTS

| | | | |
|---|---|---|---|
| 5,246,475 A * | 9/1993 | Edagawa et al. ............ 65/17.4 |
| 5,526,459 A | 6/1996 | Tanaka et al. ............... 385/142 |
| 5,949,941 A | 9/1999 | DiGiovanni ................. 385/127 |
| 5,966,491 A | 10/1999 | DiGiovanni ................. 385/127 |
| 6,411,762 B1 | 6/2002 | Anthon et al. ............... 385/123 |
| 6,474,106 B1 | 11/2002 | Crossland et al. ............ 65/377 |
| 6,477,307 B1 | 11/2002 | Tankala et al. ............. 385/127 |
| 6,483,973 B1 | 11/2002 | Mazzarese et al. ......... 385/123 |
| 7,139,458 B2 * | 11/2006 | Koh et al. ................... 385/127 |

FOREIGN PATENT DOCUMENTS

EP    0918382    11/1998

OTHER PUBLICATIONS

JP09309738; Mar. 31, 1998; vol. 1998; No. 04; Abstract.

* cited by examiner

*Primary Examiner*—Frank G. Font
*Assistant Examiner*—Michael P. Mooney
(74) *Attorney, Agent, or Firm*—Svetlana Z. Short

(57) ABSTRACT

According to one example of the invention an optical fiber comprises: (i) silica based, rare earth doped core having a first index of refraction $n_1$; (ii) at least one silica based cladding surrounding the core and having a second index of refraction $n_2$, such that $n_1 > n_2$; wherein at least one of the core or cladding is doped with $Al_2O_3$, such that the ratio of max wt % to min wt % of $Al_2O_3$ concentration is less than 2:1.

20 Claims, 13 Drawing Sheets

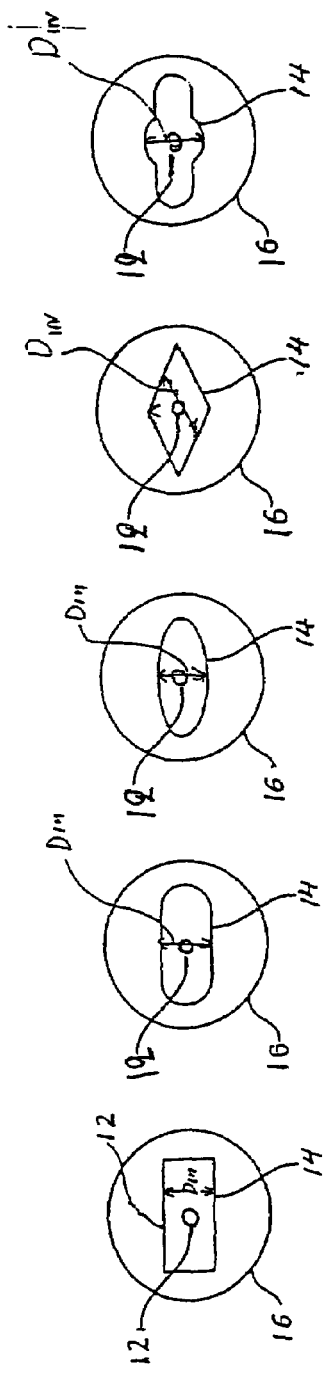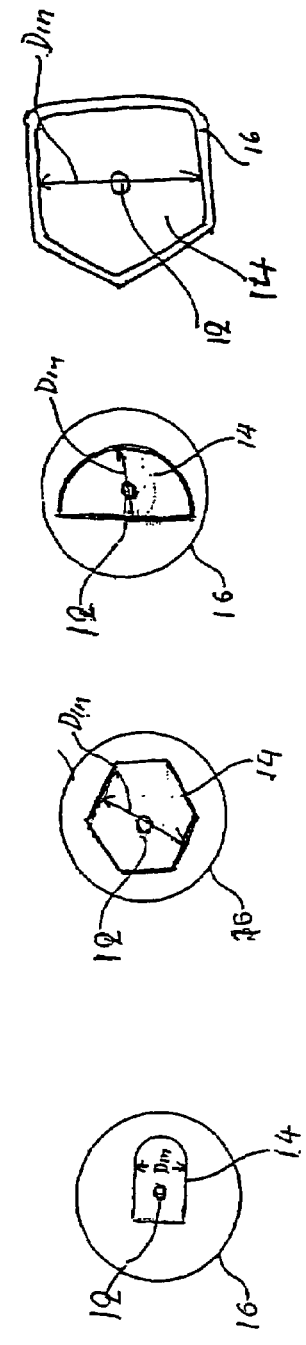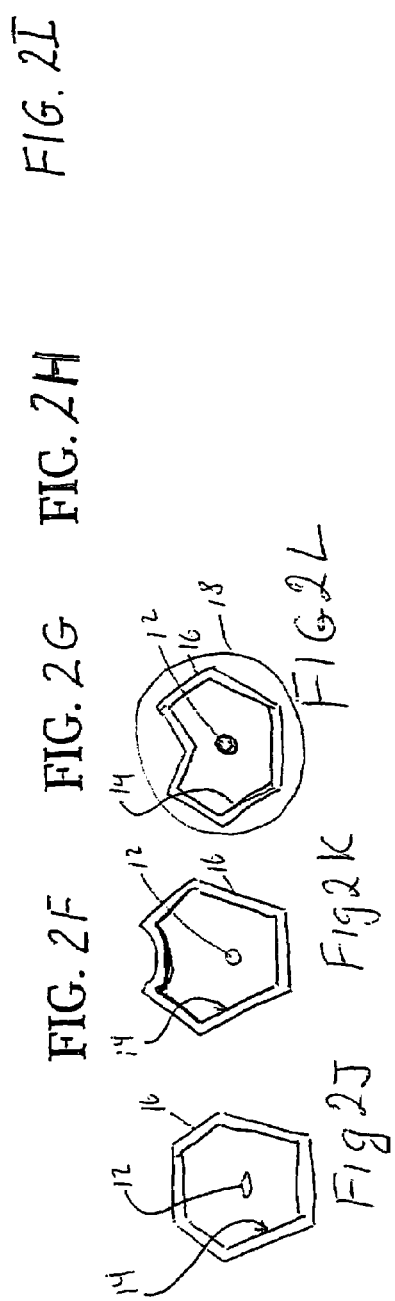

OPTICAL FIBER AND METHOD FOR MAKING SUCH FIBER

Parts of this invention were made with Government support under Agreement No. MDA972-02-3-004 awarded by DARPA. The Government may have certain rights in some of the claims of the invention.

BACKGROUND OF THE INVENTION

1. Field of the Invention

The present invention relates generally to double clad rare earth doped optical fibers, and particularly to all glass rare earth doped optical fibers suitable for use with high power light sources or in optical fiber lasers and optical amplifiers.

2. Technical Background

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer. Optical fibers with Yb doped cores and two cladding layers surrounding the core are disclosed, for example, in U.S. Pat. Nos. 6,477,307; 6,483,973; 5,966,491 and 5,949,941.

Double clad optical fiber has been used in applications requiring utilization of optical sources providing between 10 to 100 Watts of optical power, because double clad optical fiber is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the core-to-inner cladding interface, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

The single-stripe broad-area diode laser remains the most efficient and least expensive pump source. Recent progress in semiconductor laser technology has led to creation of a single-stripe multi mode broad-area laser diodes with output powers of more than 10 Watts.

Recent progress in semiconductor laser technology has led to the creation of light sources utilizing either single stripe broad-area laser diodes or laser diode bars, directly coupled to the intermediate fiber incorporated within the light source. The maximum output power of these light sources is more than 150 Watt at a wavelength of 976 nm at the output end of the intermediate fiber. The intermediate fiber diameter and numerical aperture NA of the light source is 200 μm and 0.22, respectively.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030 nm-1120 nm, respectively). Thus, conventional double-clad arrangements facilitate pumping of the fiber using a multi-mode first cladding for accepting and transferring pump energy to a core along the length of the device. Double-clad laser output can also be used to pump a cascaded Raman laser to convert the wavelength to around 1480 nm, which is suitable for pumping erbium.

How much pump light can be coupled into a double-clad fiber's inner cladding depends on the cladding size and numerical aperture NA. As is known, the "etendue" (numerical aperture multiplied by the aperture dimension or spot size) of the inner cladding should be equal to or greater than the etendue of the optical pump for efficient coupling. If the numerical aperture and spot size of the optical source (optical pump are) be different in both axes, in order to have better coupling efficiency, the etendue of the inner cladding should be maintained or exceed that of the pump in both the x and y directions.

Typically, a high numerical aperture NA of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

All-glass, Yb doped optical fibers are also known. An example of such fiber is disclosed in U.S. Pat. No. 6,411,762. The disclosed fiber, however, is not suitable for high power applications because it has a relatively low outer cladding diameter and NA, and therefore, low coupling efficiency due to light leakage outside of the optical fiber. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more.

SUMMARY OF THE INVENTION

The scope of the present invention is determined by the appended claims.

According to one example of the invention an optical fiber comprises: (i) silica based, rare earth doped core having a first index of refraction $n_1$; (ii) at least one silica based cladding surrounding the core and having a second index of refraction $n_2$, such that $n_1 > n_2$; wherein at least one of the core or cladding is doped with $Al_2O_3$, such that the ratio of max wt % to min wt % of $Al_2O_3$ concentration is less than 2:1.

According to one embodiment of the present invention, the method of making an optical fiber comprises the steps of: (i) delivering desired vapor ingredients to a flame provided by a burner, wherein at least one of the vapor ingredient includes Al and the ingredient is delivered to the flame by heated helium gas; and (ii) making a glass preform by depositing the products resulting from the vapor ingredients reacting with oxygen in a flame, to form the soot-particles, wherein at least one of the products is $Al_2O_3$.

According to one embodiment of the present invention the optical fiber comprises:

(i) a silica based, rare earth doped core having a first index of refraction $n_1$;

(ii) at least one silica based layer surrounding the core and having a second index of refraction $n_2$, such that $n_1 > n_2$; wherein the silica based layer includes in weight percent: F, 0.5 wt % to 5 wt %; and B, 0.5 wt % to 20 wt %.

According to one embodiment of the present invention the optical fiber comprises: (i) a silica based, rare earth doped core having a first index of refraction $n_1$; (ii) at least one silica based layer surrounding the core and having a second index of refraction $n_2$, such that $n_1 > n_2$; wherein the silica based layer includes in weight percent: Boron—at least 8 wt %, and Fluorine—at least 2 wt %.

Using the fiber design and the techniques described herein the optical fiber had been made which exhibits less than 8 dB/km core background loss at a wavelength of 1280 nm.

According to one embodiment of the present invention a method of making an optical fiber comprises the steps of: (i) delivering desired vapor ingredients to a flame provided by a burner; (ii) making a glass preform by depositing products resulting from the vapor ingredients reacting with oxygen in a flame, to form the soot-particles; (iii) consolidating the preform in a furnace at consolidation temperatures between 1500° C. to 1600° C.; and (iv) during the consolidation step moving the preform with respect to the furnace at the rate of at least 7 mm/min.

Some of the advantages the optical fibers disclosed herein are: high coupling efficiency, suitability for high optical power applications (100 Watts or higher), and suitability for use as polarization maintaining fiber and long deployment life.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 2A-2L are a schematic cross-sectional view of other embodiments of the present invention;

DETAILED DESCRIPTION OF THE PREFERRED EMBODIMENTS

Figure 1:
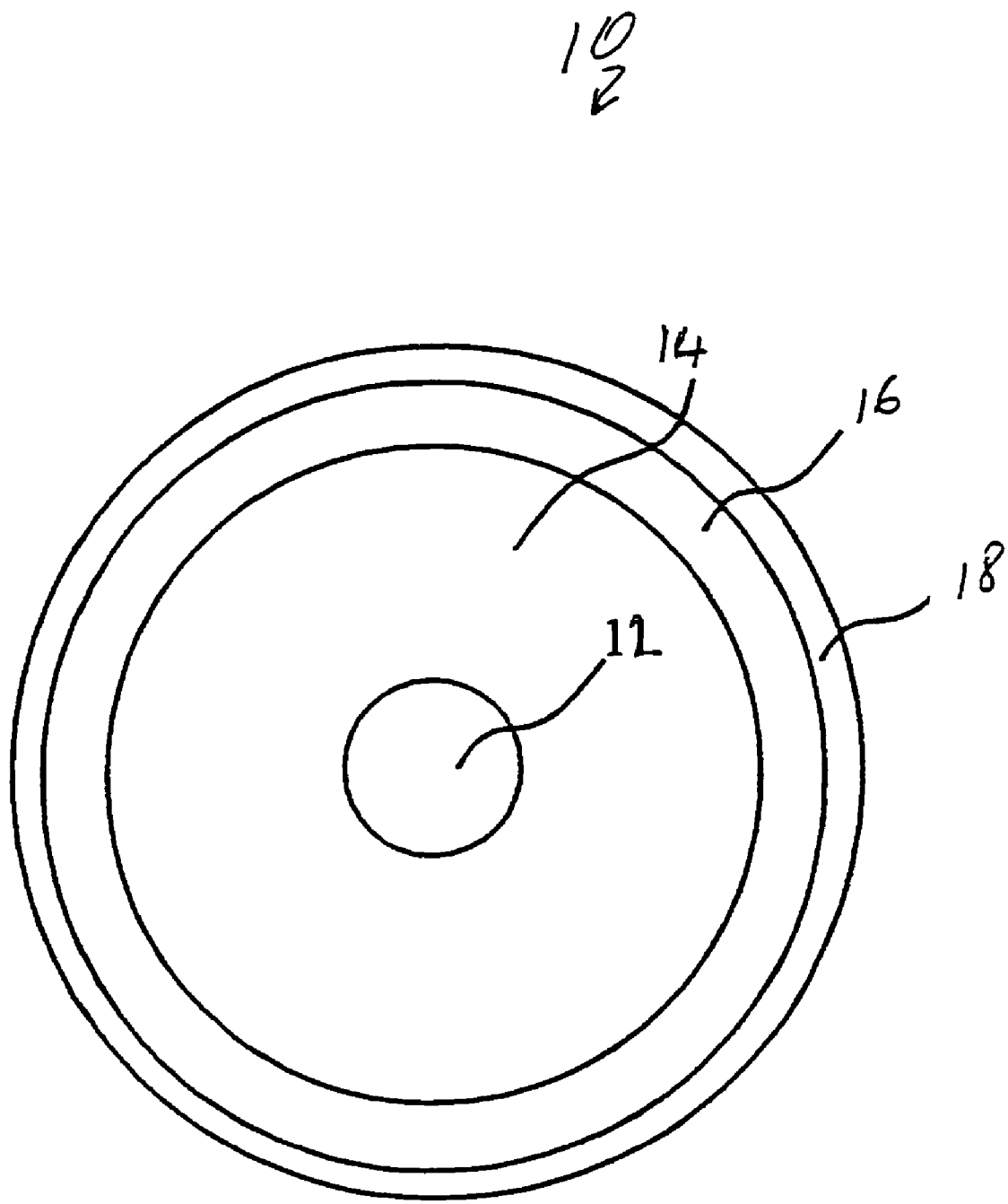
FIG. 1 is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of double clad optical fiber in accordance with the present invention is shown schematically in FIG. 1, and is designated generally throughout by the reference numeral 10. The optical fiber 10 illustrated in FIG. 1 includes: a silica based, rare earth doped core 12 having a first index of refraction $n_1$; a first silica based cladding 14 surrounding the core and having a second index of refraction $n_2$, such that $n_1 > n_2$; a silica based outer cladding 16 surrounding the first cladding and having a third index of refraction $n_3$. The core 12, inner cladding 14 and the outer cladding 16 are made of glass. A protective coating 18 surrounds the outer cladding 16. The outer coating 18 may be, for example, an organic coating which typically includes a softer primary coating and a harder secondary coating applied over the primary coating.

In this embodiment the silica based core 12 is doped with Yb, but other rare earth materials, such as Er may also be utilized. The core 12 may also include at least one index raising dopant. The outer cladding further 16 preferably includes an index lowering dopant, such that $n_2 > n_3$ The inner cladding diameter $D_{IN}$ is at least 125 µm and preferably at least 200 μm. It is even more preferable that inner cladding diameter DIN is at least 225 μm and most preferable at least 250 μm. Applicants discovered that the thick inner cladding 14 and all-glass construction of the optical fiber work in synergy to allow the optical fiber to be coupled to high energy source, and to couple the high power into the core without damaging the optical fiber. Thus, such fiber is especially suitable for high power applications.

It is preferable that the outer cladding 16 be relatively thin, with wall thickness less than 80 μm and preferably between about 5 μm and 35 μm. It is most preferable that the wall thickness of the outer cladding 16 be between about 10 μm to 25 μm. It is preferable that the diameter $D_C$ of the fiber core 12 be about 5 μm to 20 μm, the inner cladding diameter $D_{IN}$ be about 125 μm to 2000 μm and more preferably about 125 μm to 1500 μm. It is even more preferable that $D_{IN}$ be about 125 μm to 350 μm. It is preferable that the diameter of the outer cladding diameter ($D_{OUT}$) be about 145 to 2100 μm, more preferably between about 145 μm to 1600 μm and even more preferable that $D_{OUT}$ be about 145 μm to 500 μm. If the inner cladding 14 does not have a circular cross section, Din is defined as the smallest distance from one side of the inner cladding's crossection to the oppositely situated side of the crossection. It is also noted that the outer cladding 16 may not be circular. If the outer cladding 16 is not circular, $D_{OUT}$ is defined as the smallest distance from one side of the outer cladding's crossection to the oppositely situated side of the outer cladding's crossection.

It is preferable that the inner cladding's 14 cross-sectional area be at least 200 times larger than the cross sectional area of the core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| Rare earth | 0.1 to 2.5 wt %; |
| P | 0 to 5 wt %; |
| Al | 0.5 to 15 wt %; |
| Ge | 0 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process (described below). Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 5:1 to 10:1). The core 12 may also include Germanium which is an index raising dopant, and/or fluorine which is an index lowering dopant as well as a de-clustering agent.

The preferred ranges of the core 12 composition in weight percent are:

| Rare earth | 0.3 to 1 wt %; |
| P | 0 to 2 wt %; |

-continued

| Al | 2 to 8 wt %; |
| Ge | 3 to 15 wt %; and |
| F | 0.1 to 0.5 wt %. |

It is preferable that the inner cladding 14 contain 5 wt % to 30 wt % Ge to in order to provide high NA. It is even more preferable that the inner cladding comprise 5 wt % to 20 wt % Ge. It is noted that 5 wt % to 10 wt % Ge works well for many applications.

It is preferable that the index lowering dopant of the outer cladding 16 comprises Fluorine and/or Boron in weight percent:

| F | 0 to 5 wt %; |
| B | 0 to 20 wt %. |

The amount of dopant(s) for the outer cladding 16 is chosen to preferably result in inner cladding NA of between 0.15 to 0.5. However, it is preferable that the outer cladding 16 contain at least one of B or/and F. It is preferable that the minimum amount of B and/or F is at least 0.5 wt %. It is preferable that the amount of B is at least 3 wt %. It is preferable to have more than 1 wt % and more preferably more than 2 wt % of F along with more than 8 wt % of B in the outer cladding 16. It is preferable that the outer cladding 16 has less than 5 wt % of F, and less than 15 wt % of B. It is even more preferable that the amount of B and F be: 2 to 4 wt % of B, 3 to 10 wt % of F.

Other embodiments of the double clad optical fiber of the present invention are shown schematically in FIGS. 2A-2L and are generally described and depicted herein with reference to several exemplary or representative embodiments with the same numbers referenced to the same or functionally similar parts. The optical fiber cross sections depicted in FIGS. 2A-2L are similar to the optical fiber cross section depicted in FIG. 1, but have non-circular inner claddings 14. The advantage of non-circular inner cladding 14 is that non-circular shape improves the absorption of optical pump power into the core 12. The core 12 may be located either at the geometric center of the inner cladding, or may be displaced from the geometric center of the inner cladding. The inner cladding shape may be convex as shown in FIGS. 2G and 2I or concave, as shown in FIGS. 2K and 2L.

Figure 3:
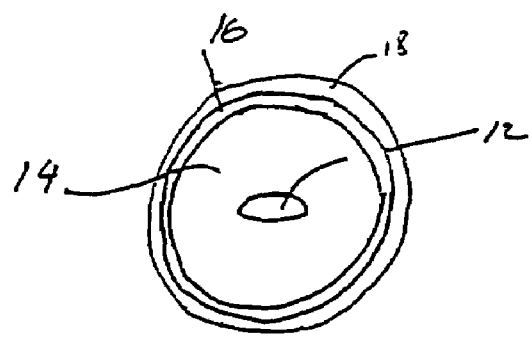
FIG. 3 is a schematic cross-sectional view of yet another embodiment of the present invention.

The optical fiber core 12 is either circular, or elliptical, as shown in FIG. 3. An optical fiber with a circular core 12 is illustrated in FIG. 1. An elliptical core 12 may be preferred because it renders polarization maintaining properties to the optical fiber. It is preferred that the aspect ratio of the elliptical core 12 be at least 1.5:1 and more preferably be between 2:1 and 5:1, because these aspect ratios improve birefringence of the core 12. An optical fiber with an elliptical core having a 2:1 ratio (ratio of major to minor axis) is depicted in FIG. 3. Thus, the optical fiber is polarization maintaining (PM) fiber if the rare earth doped core has an elliptical shape. A Yb-doped core will laze at 1.03-1.11 micron range.

In order to have polarization maintaining single mode fiber, the core 12 may be elliptical and should have an aspect ratio of at least 1.5 to 1. The numerical aperture NA of the core 12 is between 0.05 (for high power laser application) and 0.25 (for lower power application). The numerical aperture NA of the core 12 is defined as $(N1^2-N2^2)^{1/2}$. If the core 12 is not circular, it is preferable that the aspect ratio of the core be between 3:1 and 10:1.

The silica based inner cladding 14 may have a circular outer perimeter, as shown in FIG. 1 (preferably with an off-center situated core), or a non-circular outer perimeter as shown in FIG. 2. The numerical aperture NA of the pumped inner cladding is defined as $(N2^2-N3^2)^{1/2}$. The inner cladding preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding is adjacent to the core and a second (outer) cladding surrounds the first cladding. The core 12 may be either single mode or multi mode at the core lasing wavelength. The inner cladding 14 serves as a waveguide with a high numerical aperture NA for the input (pumping) light. The larger the inner cladding diameter, the more pump light is coupled into the inner cladding from the optical source. The cross-section of the first multi-mode inner cladding ($D_{IN}$ is the shorter dimension of the inner cladding as seen in FIGS. 2A-2L may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode.

Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively.

The light from this light source is then coupled to a double clad optical fiber via high NA and large aperture lenses. With this approach one can obtain 85-90% of coupling efficiency.

EXAMPLES

The invention will be further clarified by the following examples.

Example 1

Figure 4:
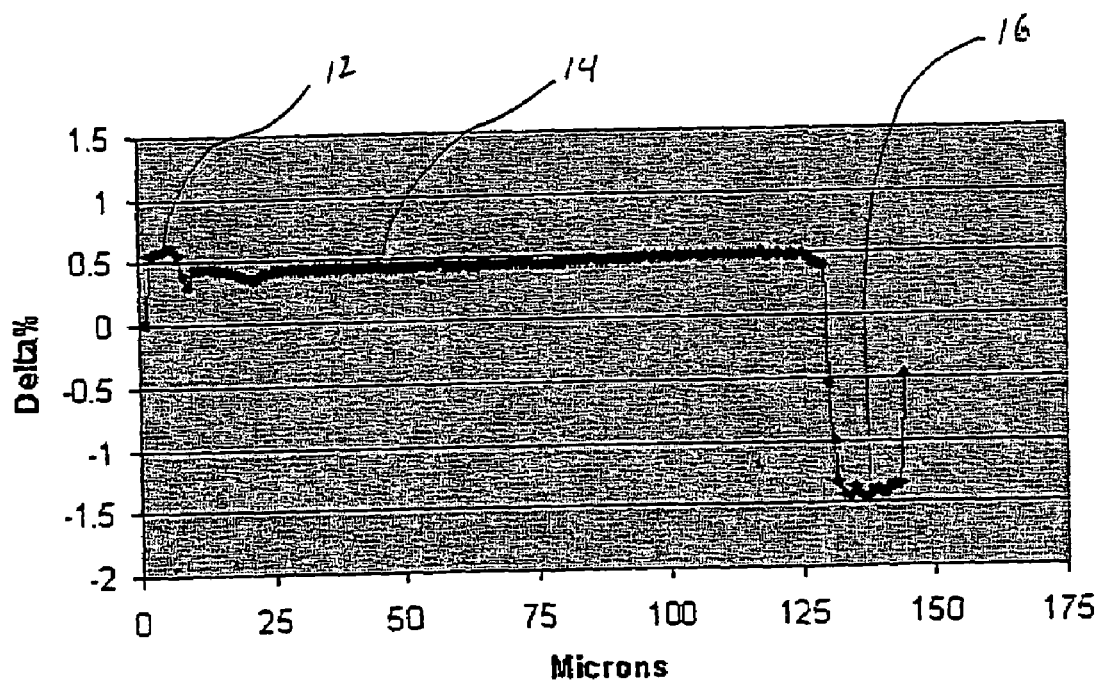
FIG. 4 is a refractive index profile of a first example of optical fiber in accordance with the present invention.

FIG. 4 illustrates a refractive index profile of a first exemplary optical fiber of the present invention. This optical fiber has the cross-section illustrated in FIG. 2I. The distance $D_{IN}$ between two opposing flat sides of this inner cladding crossection is 260 μm. FIG. 4 depicts this optical fiber's refractive index percent delta (relative to that of the pure silica) vs. the distance measured from the core center. The refractive index percent delta is defined herein as $(n_i^2-n_s^2)/2n_i^2$, where i=1, 2 or 3 and ns is the refractive index of pure silica. This optical fiber has a Yb doped core 12, a Ge-silica inner cladding (% delta ≈0.46) and an outer cladding 16 which doped with Fluorine and Boron. FIG. 4 shows that the relative refractive index difference (percent delta) of the core 12 is about 0.56, that the fluorine/boron doped outer cladding 16 has the refractive index percent delta of about −1.4. The Yb-doped fiber core is single-mode for the wavelengths above 1 μm. If the core 12 is doped with Erbium, the optical fiber will be single-mode at lasing wavelength of 1.55 μm. The optical fiber 10 has a relatively low NA (about 0.065) for the core 12, and high NA (0.30) for the inner cladding 14. (The NA is defined by $(n_i^2-n_{i+1}^2)^{1/2}$.) This inner cladding NA is preferably higher than that of the pump-source, allowing high coupling efficiency for the pump light of 90% or better. The small core NA (0.065) enables single mode operation with a large core size (10.5 microns diameter). If the core NA is higher (0.13, for example), the core diameter would have to be smaller (about 5 microns, for example) in order to be single mode. The bigger core diameter and lower core NA allows the core 12 to stay single-mode, while allowing the core to take more pump-power from the inner cladding, and also increases fiber power handling capability. The specific composition for this exemplary optical fiber is:

Core 12: 0.6 wt % $Yb_2O_3$; 4.5 wt % $AL_2O_3$; 3.0 wt % $GeO_2$; 0.2 wt % F;

Inner cladding 14: 8.5 wt % $GeO_2$;

Outer cladding 16: 9 wt % B and 2.7 wt % F.

The fiber of FIG. 4 was produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/inner cladding/outer cladding compositions are achieved by utilizing different vapor-ingredients for each of the layers in the soot preform forming process. The core/inner cladding performs is generated first, then consolidated, followed by an outer cladding outside vapor deposition process and then consolidated again. The final preform is then drawn into double-clad optical fiber 10 by known fiber-drawing methods.

Figure 5:
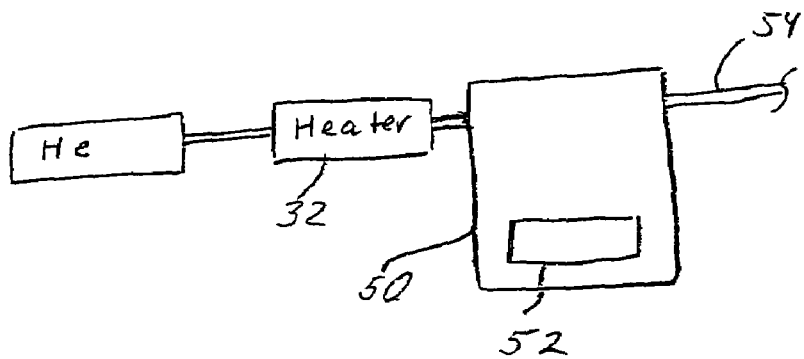
FIG. 5 is a schematic illustration of $AlCl_3$ delivery mechanism.
Figure 6:
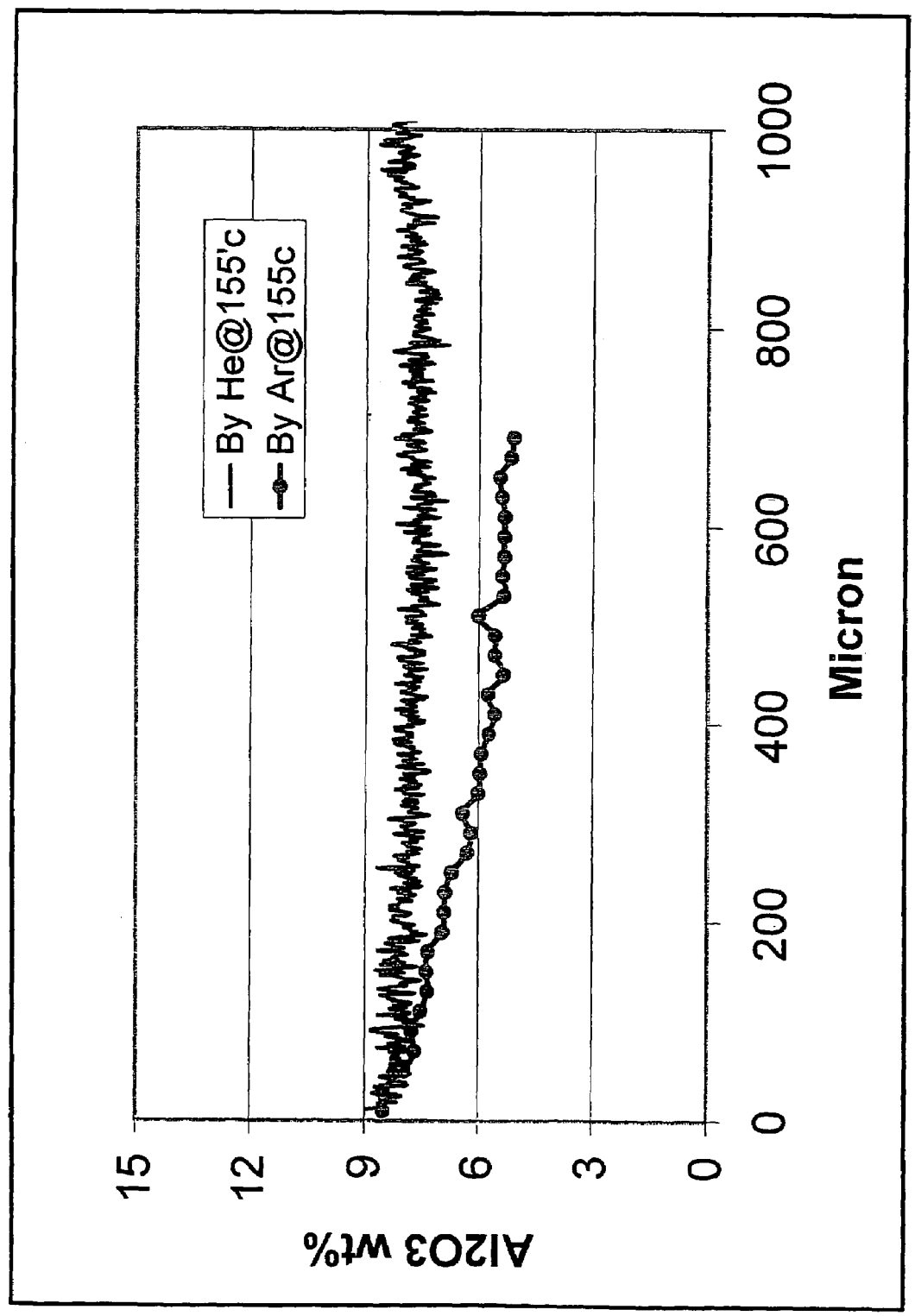
FIG. 6 illustrates $Al_2O_3$ concentration in a preform which resulted from Argon gas delivery (bottom curve) and heated Helium gas delivery (top curve)

More specifically, the exemplary vapor-precursor-materials used to make the fiber of FIG. 4 are $Yb(fod)_3$, $AlCl_3$, $SiF_4$, $SiCl_4$, $GeCl_4$ and tri-ethyl borate. During the core deposition process we achieved a uniform $AlCl_3$ gas-phase delivery. This was accomplished by utilizing heated inert Helium as carrier gas 30 (instead of Argon gas) for $AlCl_3$ delivery. As solid $AlCl_3$ changes into vapor (gas) phase, it consumes a large amount of heat. Helium gas has high thermal conductivity; effectively transfers heat to $AlCl_3$, and maintains constant vapor pressure of $AlCl_3$. It is preferable that Helium gas be provided at a temperature within 150° C. to 180° C. range. As illustrated in FIG. 5, the heated Helium gas is provided by the He gas heater 32 to the oven 50 containing $AlCl_3$ vessel 52. The relatively high Helium gas temperature helps to maintain the $AlCl_3$ containing vessel 52 at a constant temperature of about 140° C.-160° C. In order to make the optical fiber of this example, Helium gas was heated via heater 32 to 168° C. and the vessel 52 temperature was held constant at 145° C. Higher vessel temperature results higher concentration of Al in the preform. In addition, the Helium gas flow rate was also adjusted for the most uniform delivery throughout the core doping process. In this example, a 10% flow-rate slope (liter/min) is used for the delivery. (The increase in flow rate with subsequent passes was utilized for all other dopants of the core and claddings.) Heated Helium gas carries $AlCl_3$ vapor via a heated gas line 54 to the flame burner 56. To produce the optical fiber of this example, a 100 passes of core deposition process is started with 1.2 liter/min (pass #1) and ended (after pass # 100) with 1.65 liter/min, resulting in soot perform core thickness of about 2 mm to 3 mm. Heated Helium based $AlCl_3$ delivery may be utilized not only to form a fiber core, but to also provide Al doping to other fiber layers (e.g. cladding), if uniform Al doping of such layers is desired. Furthermore, heated Helium assisted delivery may be also utilized for materials other than $AlCl_3$, which are also endothermic (i.e. heat-absorbing). An Argon gas delivery of $AlCl_3$ results in $Al_2O_3$ profile in a soot preform which is illustrated in FIG. 6 (bottom curve). A Helium gas delivery of $AlCl_3$ would result in $Al_2O_3$ profile in a soot preform which is illustrated in FIG. 6 (top curve). As one can see, the uniformity of $Al_2O_3$ concentration is much better with heated Helium delivery. It is preferable that $Al_2O_3$ is evenly distributed throughout the core layer because its presence assists in de-clustering of rare earth dopant(s) within the core. This results-in high laser/amplifier efficiency through reduced quenching. This delivery process can also be utilized in Al doped (for example, in order to replace Ge) transmission fiber (i.e. fiber without rare-earth dopants in the core) when a fiber layer with relatively high index of refraction (i.e. higher than silica) is needed.

Figure 7:
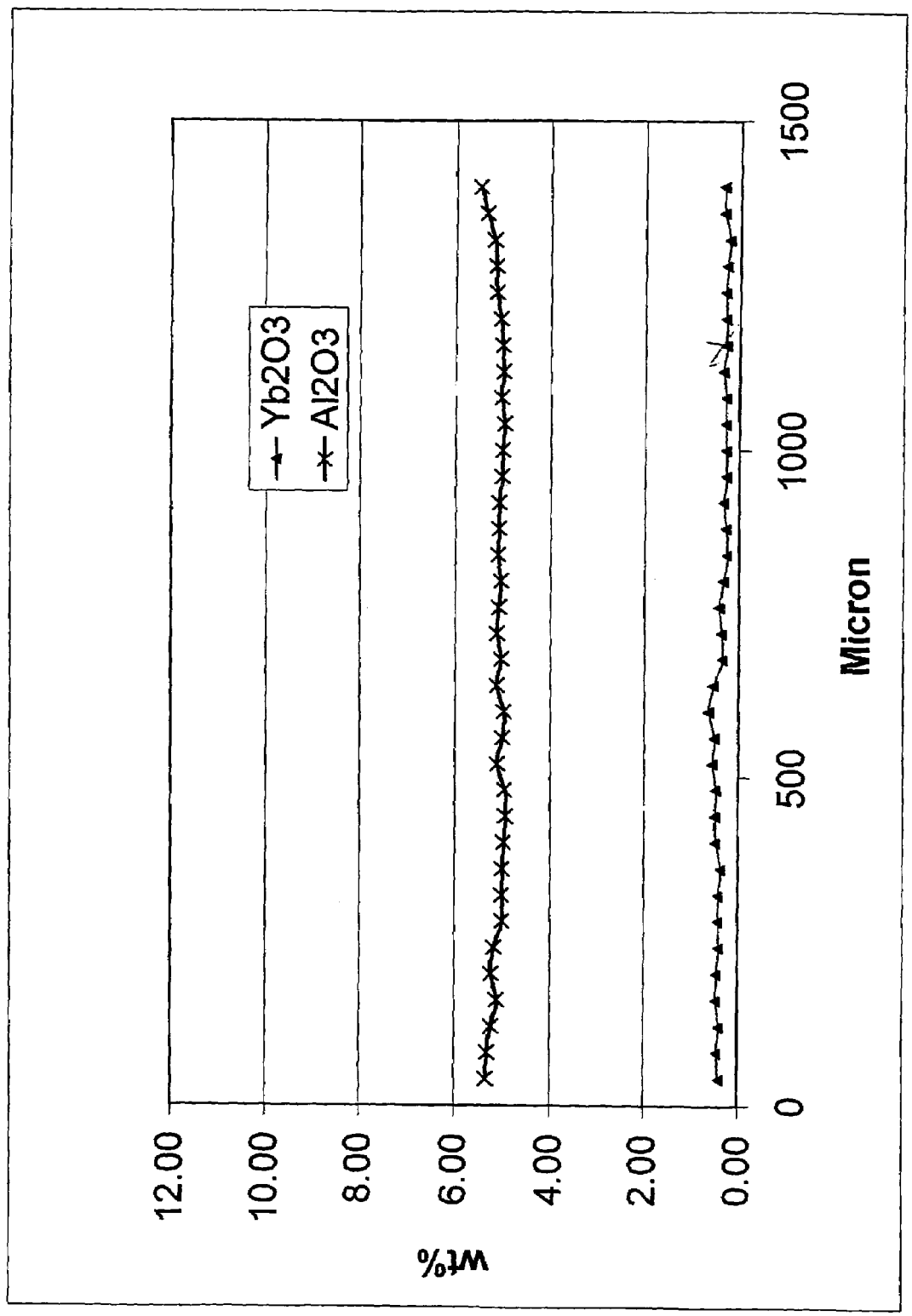
FIG. 7 is a graph illustrating $Yb_2O_3$ and $Al_2O_3$ concentration within a core optical fiber preform.

As shown in FIG. 7, the heated Helium delivery of $AlCl_3$ resulted in a very uniform distribution of Yb and Al throughout the preform core, which results in uniform concentration of Yb and Al within the fiber core 12. More specifically, the resultant variability of $Al_2O_3$ concentration in the core of is less than 2 wt % and preferably less than 0.5 wt % and more preferably less than 0.25 wt %, especially for maximum $Al_2O_3$ concentration of over 3 wt %. It is also preferable that the ratio of max wt % to min wt % of $Al_2O_3$ concentration in any given fiber layer (e.g. core, cladding, etc.) be less than 2:1, preferably less than 1.5:1, more preferably less than 1.2:1, and even more preferably less than 1.1:1, especially for maximum $Al_2O_3$ concentration of over 3 wt %.

The Yb vapor delivery is carried by Argon gas and is accomplished by heating organometallic $Yb(fod)_3$ in the temperature range of 150° C.-180° C., which results in a soot preform core with $Yb_2O_3$ concentration from about 0.2 wt % to 3 wt %. In order to make the optical fiber 10 of this example, the $Yb(fod)_3$ containing vessel temperature of 163° C. was used to achieve the $Yb_2O_3$ concentration of about 0.6 wt %. The delivery of other materials is carried out by conventional oxygen delivery at temperatures below 100° C.

Figure 8:
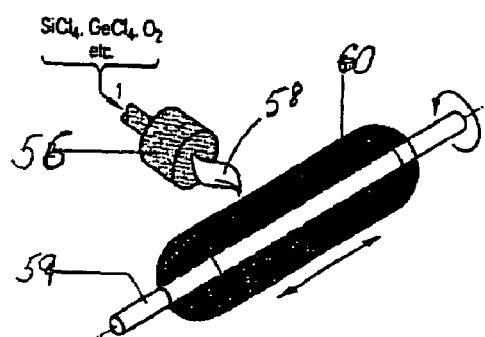
FIG. 8 is a schematic illustration of the formation of a core soot preform.

More specifically, according to one embodiment of the present invention, the $Yb(fod)_3$, $AlCl_3$, $SiF_4$, $SiCl_4$ and $GeCl_4$ are delivered to a gas burner 56. (See FIG. 8.) The gas burner 56 operates at a temperature of about 2000° C. The pre-determined amounts of various vapor-phase materials delivered for each core or clad stage are carried by oxygen provided to the burner 56, and react in the burner flame 58 where the desired glass-soot particles formed. The soot particles are then deposited onto a rotating bait-rod 59 or core cane 60 through the thermopheretic mechanism to result in the designed soot-preform having the Yb-doped single-mode core and Germanium up-doped inner cladding with a high NA. After the inner cladding soot preform layer is layered down and the soot preform 62 is cooled to room temperature, the bait rod 59 is removed.

Applicants discovered that a proper choice of high temperatures and fast down-feed rates during consolidation results in low crystallization formation in the resulting glass preform, which results in an optical fiber having very low passive (background) loss, and also eliminates the conventional double-redraw process associated with Al doped blanks.

Figure 9:
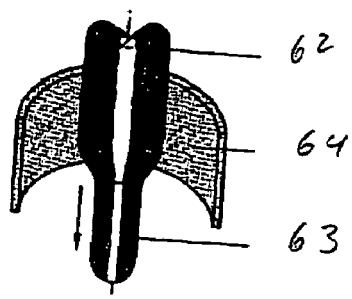
FIG. 9 illustrates consolidation of a soot preform into a glass preform.

More specifically, preform 62 is down fed relative to the furnace at the rate and temperature sufficient to minimize crystallization such that the background loss of the resultant fiber core is less than 8 dB/km at a wavelength of 1280 nm. As illustrated in FIG. 9, the 'core-inner cladding' soot preform 62 is consolidated into solid glass-preform 63 in a high temperature (1400° C. to 1600° C.) furnace 64. It is preferred that the furnace temperature during consolidation be 1500° C. to 1600° C., and more preferably 1530° C. to 1580° C. In order to produce the optical fiber 10 of this example we utilized the furnace temperature of 1550° C. Applicants found that for temperatures of below 1500° C. the preform glass forms crystals and the amount of crystallization is significantly reduced with furnace temperatures of above 1530° C. While in the furnace, the soot preform 62 is moved relative to the furnace 64 (e.g., down-fed) at a rate of 7 mm/min or faster. It is preferred that this rate be 8 mm/min to 12 mm/min. The optical fiber of this example made by was down-feeding the soot preform 62 at the rate of 9 mm/min. It is noted that instead of down-feeding the soot preform, the soot preform may be held in a constant position and the furnace may be moved instead. Thus, by specifying that the soot preform is moved relative to the furnace, applicants intend to cover any relative movement between the soot preform and the furnace. Generally, it is recommended that the higher the furnace temperature, the faster the rate of relative motion between the furnace and the soot preform.

Figure 10:
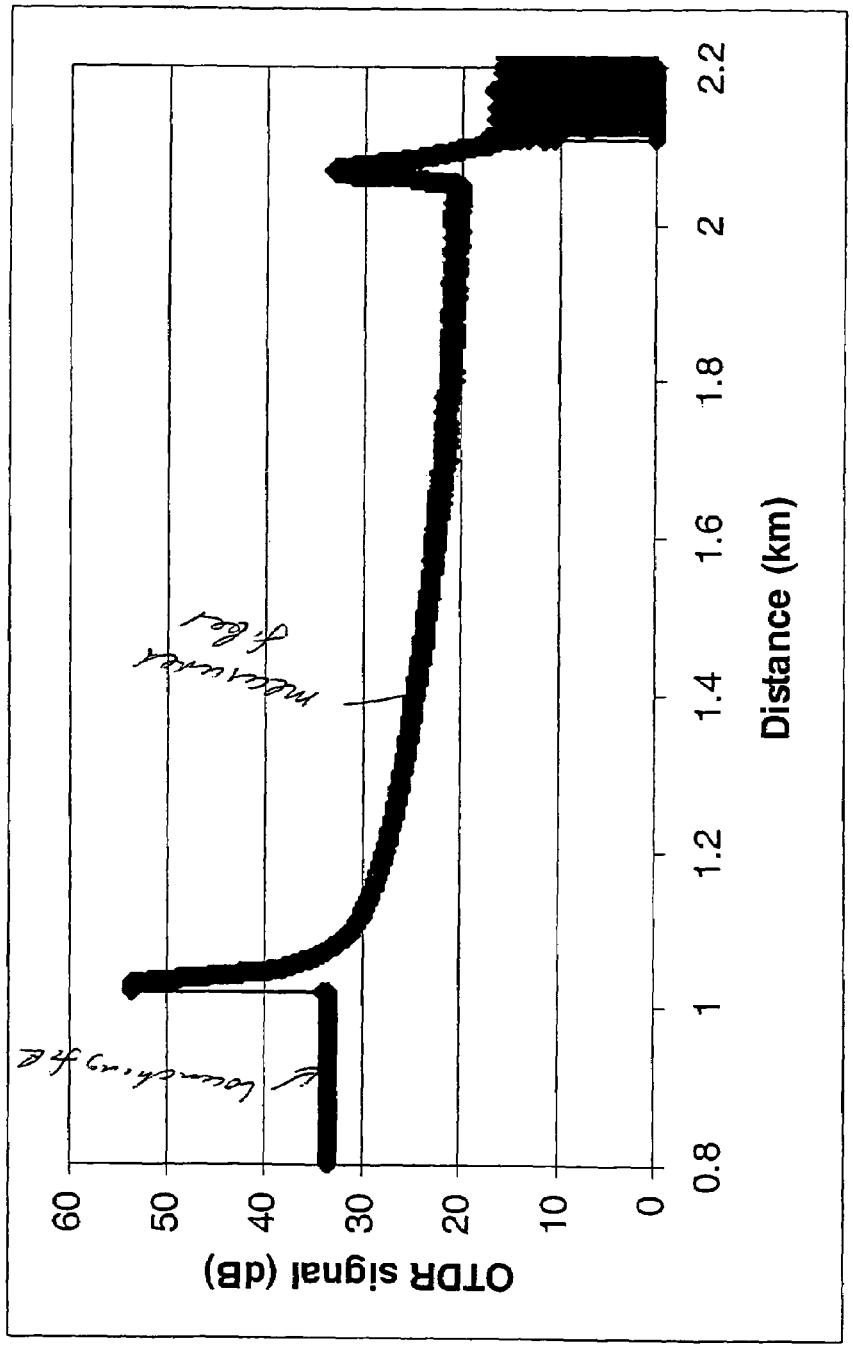
FIG. 10 illustrates inner cladding background loss of an exemplary fiber.

With the above described high consolidation temperatures and fast down-feed rate, the resultant optical fiber 10 has the core background loss of less than 8 dB/km. More preferably, the core background loss of less than 5 dB/km. In this example the background loss of the core is less than 3 dB/km. The core background loss was measured by making (single mode) optical fiber without the outer cladding and measuring the background loss of this fiber. The low inner cladding loss of this fiber (measured by optical-time-domain-reflectometer OTDR) is shown in FIG. 10. (The two spikes in the OTDR plot represent the reflections from the end faces of the measured fiber.)

If a non-circular inner cladding shape is desired, the glass preform may be machined or ground to provide desired outer perimeter shape. For example, to achieve a fiber of FIG. 2I the glass preform was ground to that shape.

$SiO_2$ with index lowering dopants was then deposited on the ground glass preform to form the outer cladding portion of the preform. In this example, the index lowering dopants are B and F. The soot particles of B and F provide low refractive index (less than that of pure silica).

More specifically, $B_2O_3$ and $SiO_2$ were vapor deposited on the ground glass preform to form a $B_2O_3$ and $SiO_2$ soot layer by using tri-ethyl borate and $SiCl_4$ delivered to the burner. The blank (i.e. machined or ground glass preform) covered with the $B_2O_3$-doped silica soot layer was then Fluorine doped during the consolidation step by using $SiF_4$ gas provided to the consolidation furnace. During this second consolidation step, the consolidation furnace is operated at the temperature range of 1300° C.-1400° C. At these consolidation temperatures Fluorine diffuses into the boron/silica soot layer, but does not penetrate into the underlying glass layer. For the optical fiber of this example was produced by utilizing consolidation temperature of 1350° C., so as to facilitate adequate Fluorine doping through diffusion.

In this example, the third layer of the preform (outer cladding) has a shape similar to that of the second layer (inner cladding).

The fiber drawing was conventional. The resulting all-glass double-clad optical fiber has the following core, inner-cladding, outer-cladding compositional format:

Core: $Yb_2O_3$:$Al_2O_3$:$SiO_2$:$GeO_2$:F;
Inner cladding: $SiO_2$:$GeO_2$;
Outer cladding: $B_2O_3$:F:$SiO_2$.

The amount of each dopant is optimized to ensure the high laser efficiency. The preferred inner cladding shape is not circularly symmetric, thus maximizing the pump absorption.

Figure 11:
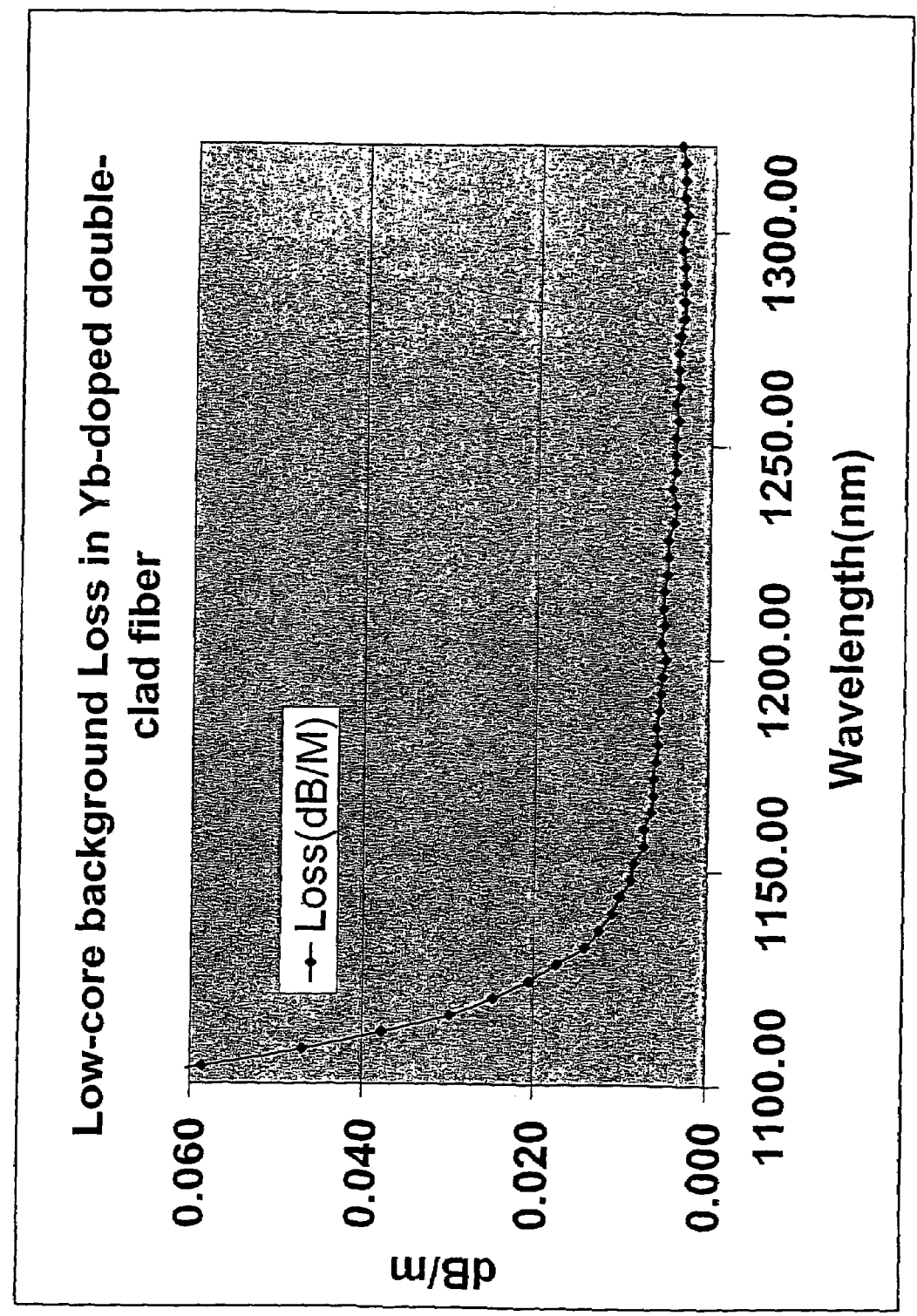
FIG. 11 is a graph illustrating passive core loss vs. wavelength of the optical fiber of FIG. 4.
Figure 12:
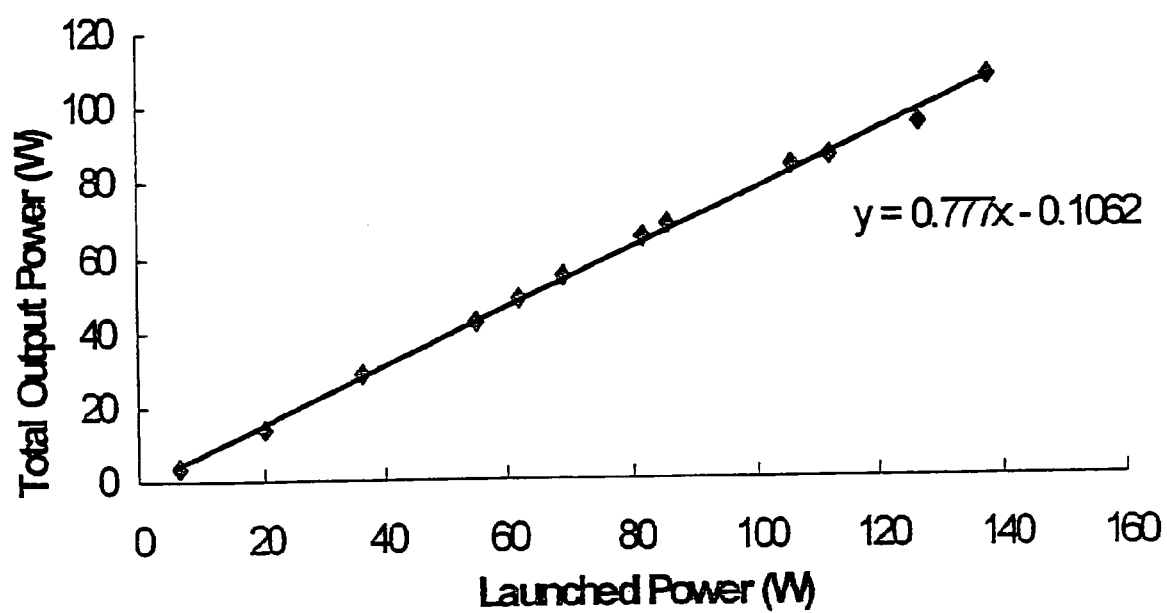
FIG. 12 is a graph of output power vs. launched power for the optical fiber of FIG. 4.

The double clad fiber produced by the OVD process is especially suitable for use in a higher power fiber laser device. FIGS. 11 and 12 correspond to the optical fiber of FIG. 4. More specifically, FIG. 5 illustrates the low passive loss, for example 3 dB/km at 1280 nm, achieved in the Yb-doped core of the fiber of FIG. 4. The passive loss of the core (also referred to as a background loss) is the inherent loss from the core materials without the absorption-effect from the active dopants such as Yb or Er etc. FIG. 12 illustrates the single mode fiber-laser efficiency of this fiber. More specifically, FIG. 12 is a graph of output power (Watts) versus input power (Watts). The optical pump wavelength is 976 nm. The optical pump is fiber coupled semiconductor laser diode bars (Ga—As/InGaAs). The output from this optical pump was launched into the inner core of the double clad optical fiber of FIG. 4. The fiber laser shows low threshold and high lasing efficiency of 78% (which is defined by the graph's slope). The fiber has good power-handling capability and operates well with optical sources that provide optical (pump) power of over 110 Watts. The optical fiber 10 of this example has absorption per unit length (when launching pump power in the inner cladding) in the range of 0.1-2 dB/m.

Example 2

Figure 13:
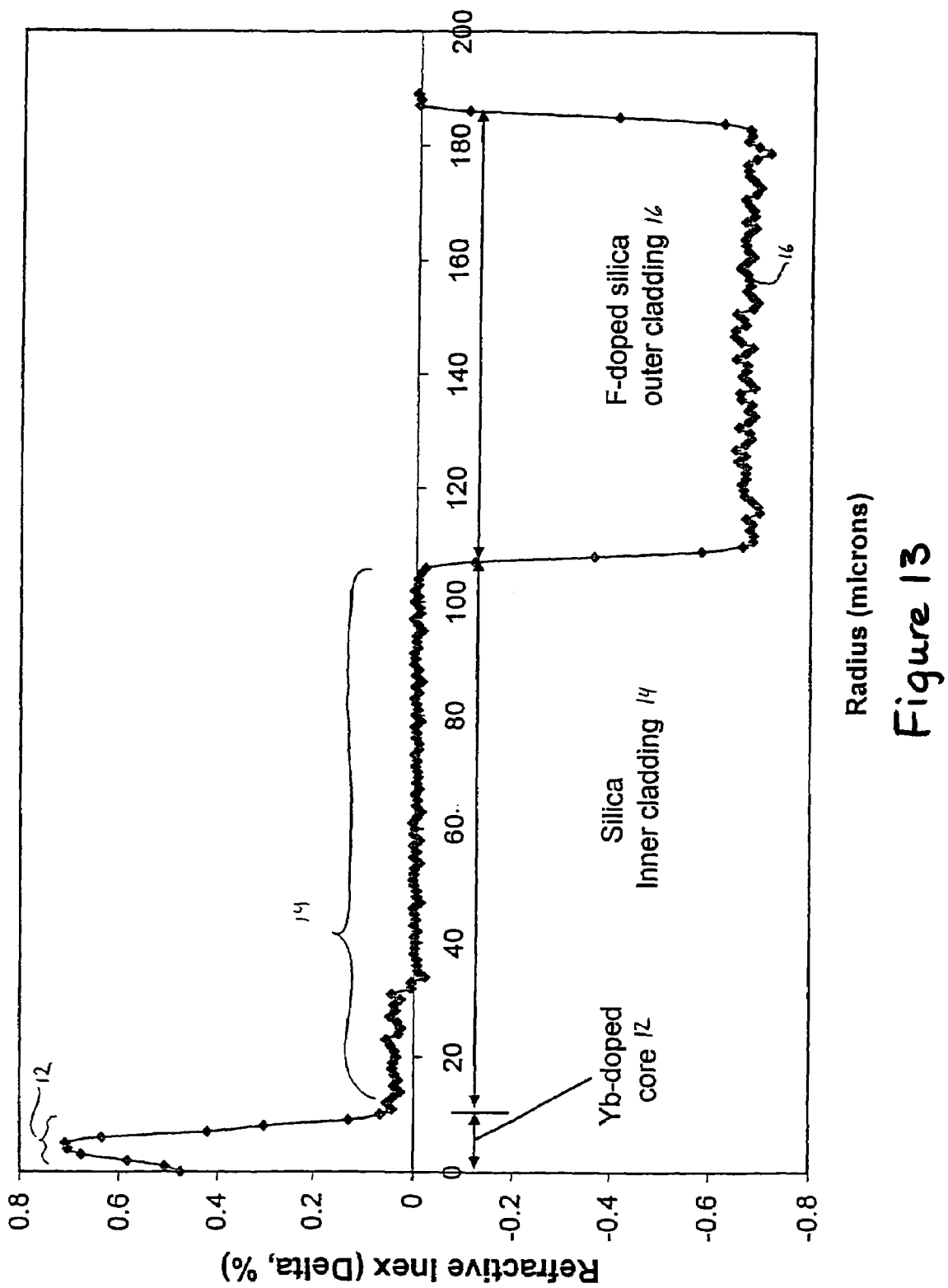
FIG. 13 is a refractive index profile of an alternative example of the optical fiber of the present invention.

FIG. 13 illustrates a refractive index profile of a second exemplary optical fiber of the present invention. More specifically, FIG. 13 depicts refractive index delta as vs. the radius for the second exemplary optical fiber. This optical fiber has a Yb doped, silica based core 12 which is multi mode at the lasing wavelength of 1100 µm, a silica based inner cladding 14 having two sections of almost the same index of refraction (delta %≈0) and an outer cladding 16 which is doped with fluorine. The NA of the inner cladding is 0.16. FIG. 13 illustrates that the refractive index difference (delta %) of the core 12 is about 0.7, that the fluorine doped outer cladding 16 has the refractive index delta of about –0.7. The core 12 and the first section of the inner cladding 14 are produced by an inside-vapor-deposition (IVD) process. The core Ge—Si soot is deposited inside the glass tube (first section of the inner cladding) and followed by solution Yb-doping of the core soot. The structure is then sintered into a solid preform. The preform is then used as a bait-rod for the OVD process for the additional inner cladding and outer cladding deposition.

Figure 14:
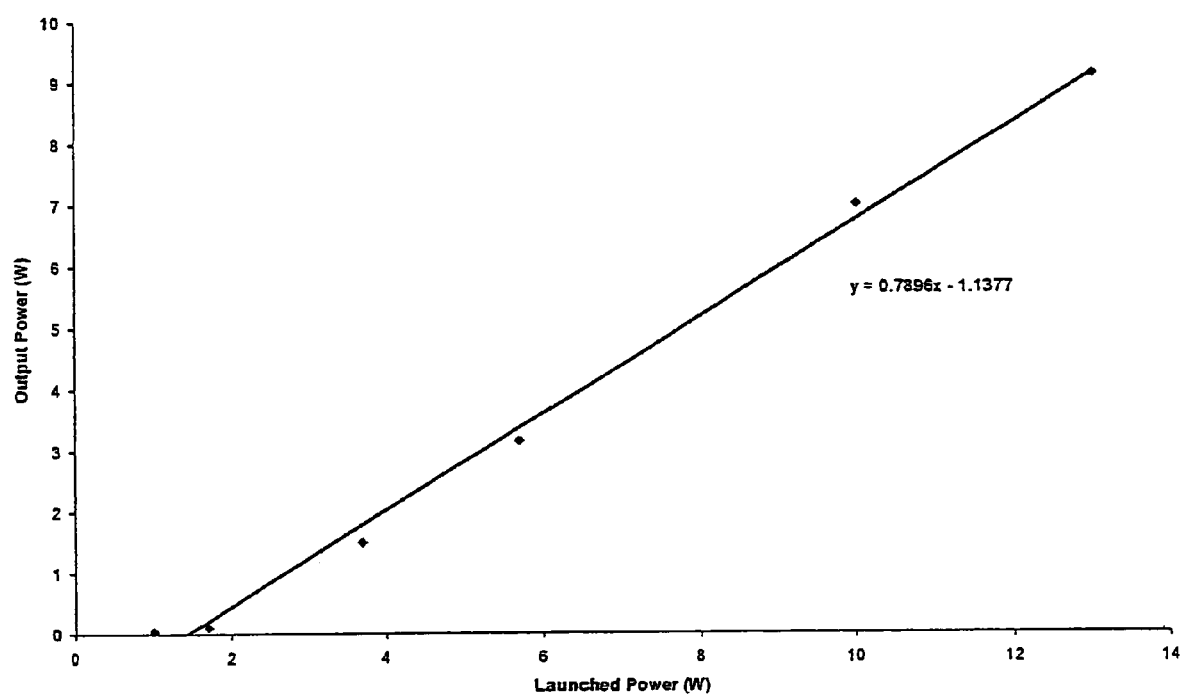
FIG. 14 is a graph of output power vs. launched power for the optical fiber of FIG. 13.
Figure 15:
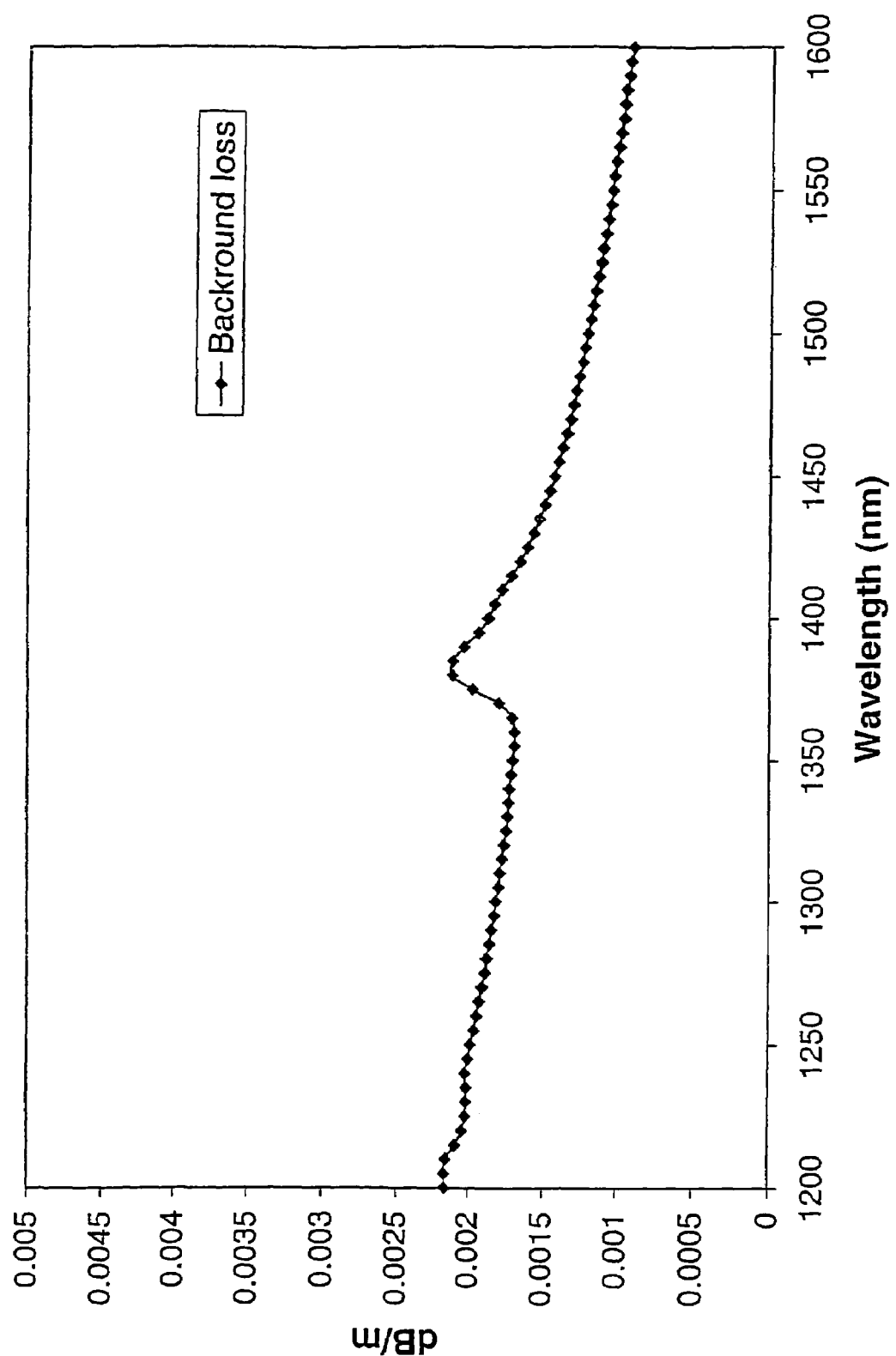
FIG. 15 is a graph illustrating passive core loss vs. wavelength of the optical fiber of FIG. 13.

The double clad optical fiber illustrated in FIG. 13 is also suitable for use in a fiber laser device. FIGS. 14 and 15 correspond to the optical fiber of FIG. 13. More specifically, FIG. 14 illustrates fiber-laser efficiency of this optical fiber. The fiber laser shows low threshold (about 1.5 Watts) and high lasing efficiency of 78% (as defined by the graph's slope). The optical fiber has good power-handling capability with power of over 10 Watts. FIG. 15 illustrates the low passive loss, for example less than 2 dB/km at 1280 nm, achieved in the Yb-doped core of the fiber of FIG. 13.

The specific composition for the optical fiber of the second example is:
Core 12: 0.8 wt % $Yb_2O_3$; 9.5 cwt % $P_2O_5$; 5.4 wt % $GeO_2$;
Inner cladding 14: Pure Silica;
Outer cladding 16: 2.3 wt % F.

Example 3

Figure 16:
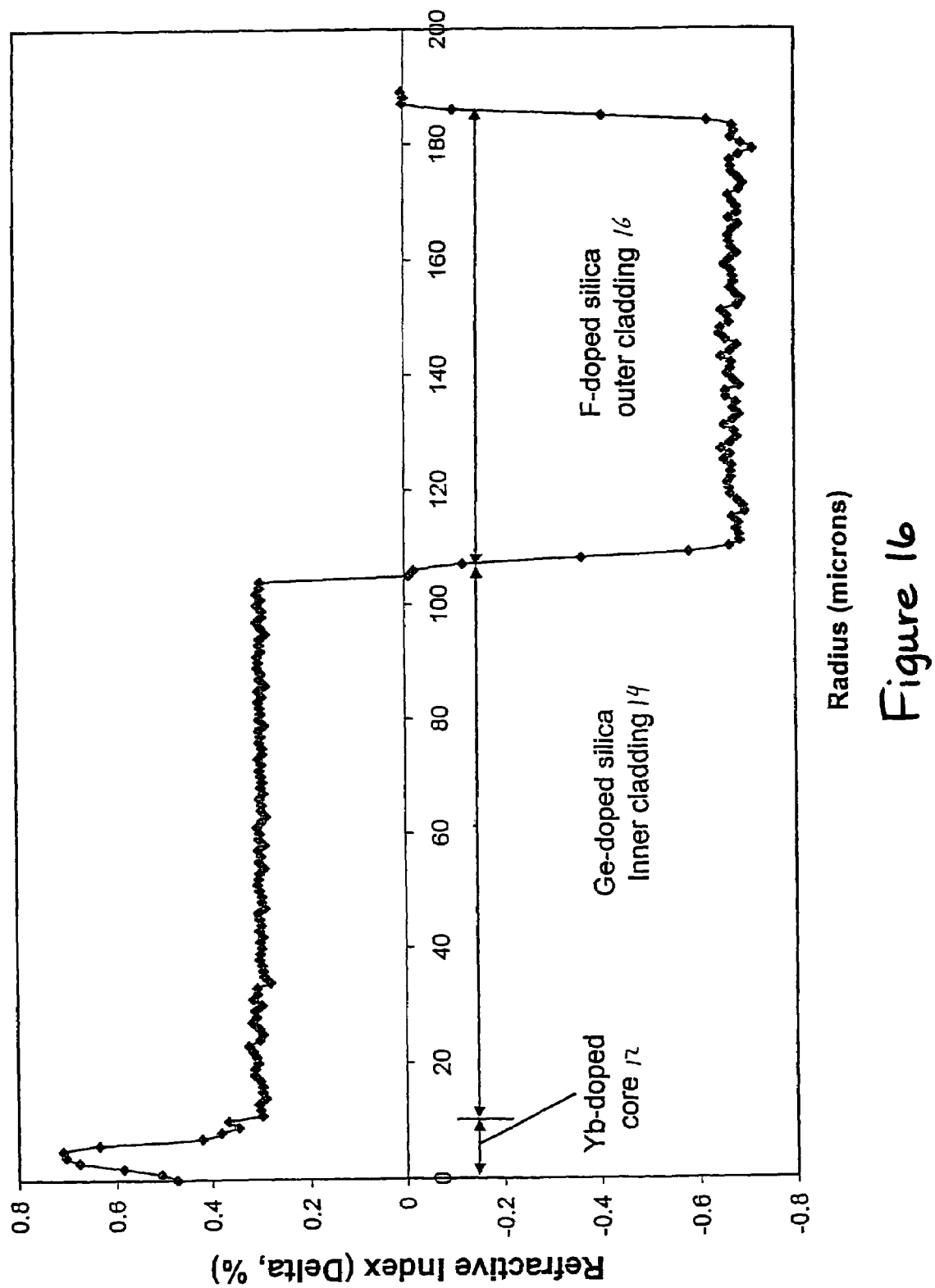
FIG. 16 is a refractive index profile of another alternative example of the optical fiber in accordance with the present invention.

FIG. 16 illustrates a refractive index profile of a third exemplary optical fiber of the present invention. This optical fiber has a Yb doped core 12, a silica based, Ge doped inner cladding 14 with the relative refractive index (% delta %) of 0.3 and an outer cladding 16 which is doped with Fluorine. FIG. 16 shows that the refractive index difference (% delta) of the core 12 is about 0.7 and that the fluorine doped outer cladding 16 has the refractive index % delta of about –0.7. The specific composition for this optical fiber example is:
Core 12: 0.8 wt % $Yb_2O_3$; 9.5 wt % $P_2O_5$; 5.4 wt % $GeO_2$;
Inner cladding 14: 6 wt % $GeO_2$;
Outer cladding 16: 2.3 wt % F It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   (i) a silica based, rare earth doped core having a first index of refraction $n_1$;
   (ii) at least one silica based cladding surrounding the core and having a second index of refraction $n_2$, such that $n_1 > n_2$;
   wherein at least one of the core or cladding is doped with $Al_2O_3$, such that the ratio of max wt % to min wt % of $Al_2O_3$ concentration in said core or cladding is less than 1.5:1.

2. The optical fiber according to claim 1 wherein $Al_2O_3$ dopant is the core.

3. The optical fiber according to claim 2 wherein said ratio is less than 1.2:1.

4. The optical fiber according to claim 2 wherein said ratio less than 1.1:1.

5. The optical fiber according to claim 2 wherein said fiber core includes rare earth dopant(s).

6. The optical fiber as in any one of claims 1-5 wherein maximum $Al_2O_3$ concentration is over 3 wt %.

7. The optical fiber of claim 6 wherein said optical fiber includes an inner cladding and an outer cladding surrounding the inner cladding.

8. The optical fiber according to claims 1 wherein said fiber is manufactured by the outside vapor deposition process.

9. The optical fiber according to claims 8 wherein $AlCl_3$ is delivered to a burner with heated Helium gas.

10. An optical fiber comprising:
    (i) a silica based, rare earth doped core having a first index of refraction $n_1$;
    (ii) at least one silica based layer surrounding the core and having a second index of refraction $n_2$, such that $n_1 > n_2$;
    wherein said layer includes in weight percent:

| F | 0.5 to 5 wt %; and |
|---|---|
| B | 0.5 to 20 wt %. |

11. The optical fiber according to claim 10, wherein the amount of Boron and Fluorine is as follows:

| F | 1 to 5 wt %; and |
|---|---|
| B | 3 to 20 wt %. |

12. The optical fiber according to claim 10, wherein the amount of Boron and Fluorine is as follows:

| F | 1 to 4 wt %; and |
|---|---|
| B | 5 to 15 wt %. |

13. The optical fiber according to claim 10, wherein the amount of Boron is at least 8 wt % and the amount of Fluorine is at least 2 wt %.

14. The optical fiber as in any one of claims 10-12, wherein said layer is a cladding layer.

15. The optical fiber according to claim 14, wherein said optical fiber has an inner cladding layer and an outer cladding layer, and said cladding layer doped with Boron and Fluorine is the outer cladding layer.

16. An optical fiber comprising:

silica based, rare earth doped core having a first index of refraction $n_1$;

at least one silica based layer surrounding the core and having a second index of refraction $n_2$, such that $n_1 > n_2$; wherein said layer includes in weight percent: Boron—at least 8 wt %, and Fluorine—at least 2 wt %.

17. The optical fiber according to claim 1, wherein the core background loss of said fiber is less than 5 dB/km at a wavelength of 1280 nm.

18. The optical fiber according to claim 17 wherein the core background loss of said fiber is less than 3 dB/km at a wavelength of 1280 nm.

19. The optical fiber according to claim 1 wherein said fiber includes an inner cladding surrounding said core, an outer cladding layer surrounding said inner cladding layer.

20. The optical fiber according to claim 19 wherein said dopant is Yb or Er.

* * * * *